(12) United States Patent
Huang (10) Patent No.: US 9,497,388 B2
(45) Date of Patent: Nov. 15, 2016

(54) ZOOMING FACTOR COMPUTATION

(75) Inventor: Chien-Min Huang, Clovis, CA (US)

(73) Assignee: PELCO, INC., Clovis, CA (US)

( * ) Notice: Subject to any disclaimer, the term of this patent is extended or adjusted under 35 U.S.C. 154(b) by 632 days.

(21) Appl. No.: 12/971,561

(22) Filed: Dec. 17, 2010

(65) Prior Publication Data

US 2012/0154599 A1 Jun. 21, 2012

(51) Int. Cl.
*H04N 5/247* (2006.01)
*H04N 5/232* (2006.01)
*G08B 13/196* (2006.01)

(52) U.S. Cl.
CPC .......... *H04N 5/247* (2013.01); *G08B 13/1963* (2013.01); *G08B 13/19608* (2013.01); *G08B 13/19641* (2013.01); *G08B 13/19643* (2013.01); *H04N 5/232* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 5,164,827 A | 11/1992 | Paff | |
| 5,434,621 A * | 7/1995 | Yu | 348/347 |
| 6,404,455 B1 | 6/2002 | Ito et al. | |
| 6,724,421 B1 | 4/2004 | Glatt | |
| 8,488,001 B2 * | 7/2013 | Mohanty et al. | 348/159 |
| 2004/0100563 A1 | 5/2004 | Sablak et al. | |
| 2006/0056056 A1 | 3/2006 | Ahiska et al. | |
| 2006/0203098 A1 * | 9/2006 | Henninger, III | G06K 9/00771 348/211.99 |
| 2006/0209186 A1 * | 9/2006 | Iyoda | G06T 7/0018 348/142 |
| 2007/0110418 A1 * | 5/2007 | Imada | 396/55 |
| 2008/0002964 A1 * | 1/2008 | Edwards | 396/374 |
| 2008/0117296 A1 | 5/2008 | Egnal et al. | |
| 2009/0028386 A1 | 1/2009 | Michimoto et al. | |
| 2009/0046157 A1 | 2/2009 | Cilia et al. | |
| 2009/0073388 A1 * | 3/2009 | Dumm | 352/243 |
| 2010/0007740 A1 | 1/2010 | Greiffenhagen et al. | |
| 2010/0141767 A1 | 6/2010 | Mohanty et al. | |
| 2011/0128385 A1 * | 6/2011 | Bedros et al. | 348/164 |
| 2012/0038776 A1 * | 2/2012 | Ahiska et al. | 348/159 |

FOREIGN PATENT DOCUMENTS

| | | |
|---|---|---|
| CN | 101379825 A | 3/2009 |
| EP | 1619897 A1 | 1/2006 |

OTHER PUBLICATIONS

International Search Report and Written Opinion for PCT/US2011/065236, mailed May 7, 2012.
International Preliminary Report on Patentability for International Application No. PCT/US2011/065236, dated Jun. 27, 2013, 6 pgs.

(Continued)

*Primary Examiner* — Kevin McInnish
(74) *Attorney, Agent, or Firm* — Hunter Clark PLLC (57) ABSTRACT

Systems, methods, and devices are disclosed for determining a zooming factor for a camera in a pan, tilt, and zoom (PTZ) camera tracking system to enable a camera to keep an object at a constant size within the camera's viewing area, despite changes in the object's distance from the camera. This provides a complement to a camera's pan and tilt tracking of the moving object. For example, a PTZ camera tracking system that determines an object to track, utilizes information regarding images of the object of interest are used to determine a zooming factor (or other zooming value) for a camera in the PTZ camera tracking system. This information includes variables such as tilt angles of one or more cameras and a reference zooming factor.

27 Claims, 9 Drawing Sheets

(56) References Cited

OTHER PUBLICATIONS

Supplementary European Search Report & European Search Opinion dated May 11, 2015 for European Application No. EP11848143, 8 pgs.

IP Australia 1st Examination Report for Application No. 2011343674, dated Jul. 30, 2015, 3 pgs.

IP Australia 2nd Examination Report for Application No. 2011343674, dated Mar. 1, 2016, 3 pgs.

State Intellectual Property Office of the P.R.C. (SIPO) 1st Office Action and Search Report for Application No. 201180066727.4 dated Oct. 30, 2015, 9 pgs.

* cited by examiner

ZOOMING FACTOR COMPUTATION

BACKGROUND

Surveillance systems are often used to monitor activity of a secure area. For instance, video cameras and other devices can provide visual, audio, movement, heat and other information that can allow a security guard to determine whether a secure area is being breached. These systems can be partially or wholly automated to provide efficient monitoring of the secure area.

Modern processors and other computing devices have the processing power to automate the tracking of a moving object within a camera's viewing area. These systems run algorithms to determine that an object is moving and adjust the pan and tilt of a camera to try to ensure that the object does not leave the camera's viewing area. As the distance of the object to the camera changes, the zooming factor of the camera can be adjusted.

SUMMARY

An example of a method of computing a zooming factor includes receiving first image information, from the image source, of a first image of an object of interest. The first image information corresponds to a first tilt angle of the image source. The method further includes receiving second image information, from the image source, of a second image of the object of interest. The second image information is indicative of a second tilt angle of the image source. The method also includes determining a first zooming value corresponding to the first image and calculating a second zooming value using the first tilt angle, the first zooming value, and the second tilt angle. Finally, the method includes sending zooming information, indicative of the second zooming value, to the image source.

Implementations of such a method may include one or more of the following features. Capturing the first image with a first camera of the image source using the first tilt angle while the object of interest is at a particular position; and capturing the second image with a second camera, separate from the first camera, of the image source using the second tilt angle while the object of interest is at substantially the particular position. Calculating the second zooming value further using at least one of a height of the first camera relative to the ground, or a height of the second camera relative to the ground. Controlling tracking of the object of interest by the second camera. Determining the first zooming value is based, at least in part, on a size of the object of interest relative to the viewing area of the first camera. Determining the first zooming value based, at least in part, on a larger of a height and a width of the portion of the viewing area of the first camera occupied by the object of interest. Where the image source comprises a camera, the method further comprises capturing the first image while the object of interest is at a first distance from the camera; and capturing the second image while the object of interest is at a second distance from the camera. Producing and sending the first image information and the second image information from a processor physically located within a housing of the camera. Determining the first zooming value based, at least in part, on a size of the object of interest relative to a viewing area of the camera. Determining at least one of the first tilt angle or the second tilt angle.

An example of a non-transitory machine-readable storage medium according to the disclosure includes instructions embodied thereon that, when executed by at least one machine, cause the at least one machine to determine, from first image information provided by an image source, a first zooming value corresponding to a first image of an object of interest where the first image information corresponds to a first tilt angle of the image source; determine, from second image information provided by the image source, a second tilt angle corresponding to a second image of an object of interest; calculate a second zooming value by using the first tilt angle, the first zooming value, and the second tilt angle; and send zooming information indicative of the second zooming value toward the image source.

Implementations of such a method may include one or more of the following features. The instructions that cause the at least one machine to calculate the second zooming value cause the at least one machine to use at least one of: a height of a first camera relative to the ground, or a height of a second camera relative to the ground. The instructions, when executed by the at least one machine, cause the at least one machine to control tracking of the object of interest by the second camera. The first zooming value is based, at least in part, on a size of the object of interest relative to the viewing area of the first camera. The first zooming value is based, at least in part, on a size of the object of interest relative to a viewing area of a camera. The instructions, when executed by the at least one machine, further cause the at least one machine to determine at least one of the first tilt angle or the second tilt angle.

An example of a system for calculating a zooming factor according to the disclosure includes a first camera having a first tilt angle and a viewing area, the first tilt angle being fixed. The first camera is configured to capture a first image of an object of interest while the object of interest is at a particular position; and output data regarding the first image. The system also comprises a second camera having an adjustable tilt angle enabling the second camera to track the object of interest. The second camera is configured to capture, using a second tilt angle, a second image of the object of interest while the object of interest is at substantially the particular position; and output data regarding the second tilt angle. The system further comprises a processor communicatively coupled with the first camera and the second camera. The processor is configured to determine a first zooming value for the first camera; calculate a second zooming value using the first tilt angle, the first zooming value, and the second tilt angle; and send information to cause a zooming value of the second camera to change according to the second zooming value.

Implementations of such a system may include one or more of the following features. The processor is configured to determine the first zooming value based, at least in part, on a portion of the viewing area of the first camera occupied by the object of interest. The processor is configured to determine the first zooming value based, at least in part, on a larger of a height and a width of the portion of the viewing area of the first camera occupied by the object of interest. The processor is located within a housing of the first camera or the second camera. The processor is further configured to control the tracking of the object of interest by the second camera. The processor is configured to calculate the second zooming value using at least one of a height of the first camera relative to the ground, or a height of the second camera relative to the ground.

An example of another system for calculating a zooming factor according to the disclosure includes a camera having an adjustable tilt angle and being configured to track an object of interest, the camera being further configured to capture a first image of the object of interest, with the camera set to a first tilt angle and a first zooming value; change a tilt angle of the camera from the first tilt angle to a second tilt angle in response to a change in the distance of the object of interest to the camera; capture a second image of the object of interest, with the camera set to the second tilt angle; and provide indications of the first tilt angle, the first zooming value, and the second tilt angle. The system further comprises a processor, communicatively coupled to the camera, configured to calculate a second zooming value using the first tilt angle, the first zooming value, and the second tilt angle; and send information to the camera to cause the zooming value of the camera to change from the first zooming value to the second zooming value.

Implementations of such a system may include one or more of the following features. The first zooming value is based, at least in part, on a portion of the viewing area of the first camera occupied by the object of interest. The processor is located within a housing of the camera. The processor is further configured to control the tracking of the object of interest by the camera.

Items and/or techniques described herein may provide one or more of the following capabilities, as well as other capabilities not mentioned. Automatic zoom control can be provided for a pan, tilt, and zoom (PTZ) camera with little processing power. Zoom control of a PTZ camera can be integrated with manual and/or automatic PTZ camera tracking Zoom control for multi-camera video systems can be provided. These capabilities can increase efficiency of the systems controlling the PTZ zooming.

DETAILED DESCRIPTION

Techniques are discussed herein for determining a zooming factor for a camera in a pan, tilt, and zoom (PTZ) camera tracking system to enable a camera to keep an object at a substantially constant size within the camera's viewing area, despite changes in the object's distance from the camera. This provides a complement to a camera's pan and tilt tracking of the moving object. For example, a PTZ camera tracking system that determines an object to track (hereinafter called the "object of interest"), utilizes information regarding images of the object of interest to determine a zooming factor (or other zooming value) for a camera in the PTZ camera tracking system. The information used includes variables such as tilt angles of one or more cameras and a reference zooming factor.

The variables used to determine a zooming factor can be obtained in different ways. For example, a master camera and a slave camera can be used in which the master camera provides a first tilt angle and reference zooming factor. The first tilt angle of the master camera is fixed, but the reference zooming factor can be determined from images captured by the master camera. The slave camera, on the other hand, tracks an object of interest and has a variable tilt angle that changes as the distance of the object of interest from the slave camera changes. The tilt angles and reference zooming factor are determined while the object of interest is at a certain position. This typically entails determining these variables at a given moment in time.

Another example uses a single camera that tracks an object of interest. Tilt angles and a reference zooming factor are determined at different moments in time. A first zooming factor and a first tilt angle of the camera while the object of interest is at a first distance from the camera are used to determine a second zooming factor for a second tilt angle while the object of interest is at a second distance from the camera.

The terms "zooming factor" and "zooming value" are used generically herein and do not limit the scope of this disclosure. Numerous values can be used for the "zooming factor" or "zooming value" including values inversely proportional to the zoom, such as a focal length. Ultimately, any appropriate value that can be used as an indicator of the zoom level of a camera can be used with appropriate modification to the equations detailed herein.

Figure 1:
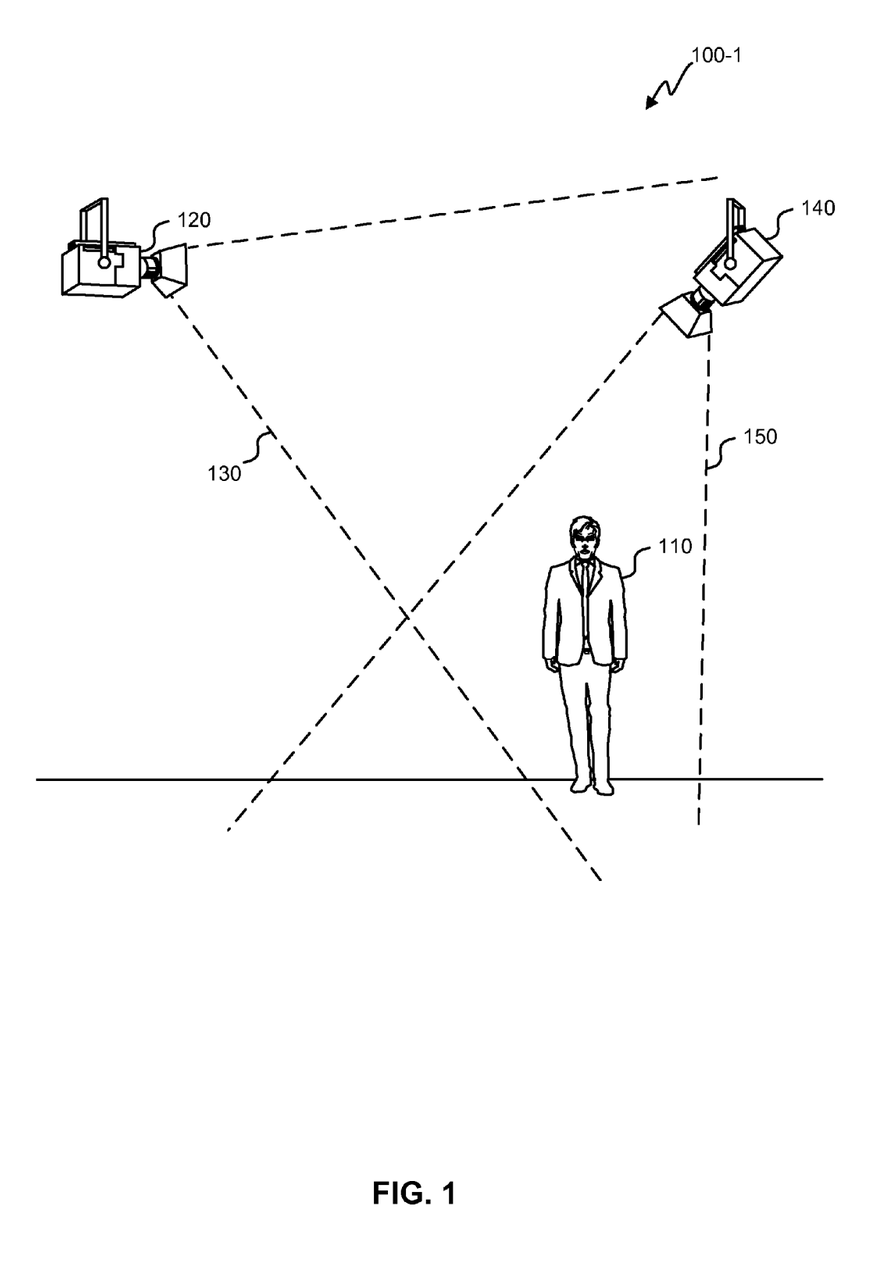
FIG. 1 is an illustration of a video surveillance system utilizing a master camera and a slave camera.

FIG. 1 illustrates of a surveillance system 100-1 utilizing a master camera 120 and a slave camera 140. The master camera 120 can comprise any of a variety of cameras, including fixed and adjustable cameras. For example, a PTZ camera, such as the Spectra® HD, by Pelco® of Clovis, Calif., can be a suitable master camera 120. The master camera 120 is located at a known height and provides a fixed viewing area 130 that allows the master camera to easily detect an object of interest 110 by utilizing a background subtraction-based algorithm. The location of the object of interest 110 obtained from the master camera 120 is translated into pan and tilt angles, as well as a zooming factor, for the slave camera 140.

The slave camera 140 is also located at a known height, which may differ from the height of the master camera 120, and can vary, depending on the desired functionality of the surveillance system 100-1. The slave camera 140 is a PTZ camera, and as the object of interest 110 moves, the slave camera 140 tracks the movement of the object of interest 110 by adjusting the tilt and pan angles accordingly, keeping the object of interest 110 within the slave camera's viewing area 150. The zooming factor of the slave camera 140 is adjusted, as detailed herein, using a reference zooming factor of the master camera 120 and tilt angles of both the master camera 120 and the slave camera 140.

The reference zooming factor is determined based on the size of the object of interest 110 as it appears in the master camera's viewing area 130. For example, information from the master camera 120 and/or the slave camera 140 can be used to adjust the zoom of the camera 140 such that the object of interest 110 initially occupies about 80% of the slave camera's viewing area 150 (i.e., 80% of an image/screen provided by the slave camera 140). Thereafter, when the object of interest 110 moves and the slave camera pans and/or tilts to ensure the object of interest 110 remains in the slave camera's viewing area 150, the zooming factor of the slave camera 140 is computed and subsequently adjusted such that the object of interest 110 continues to occupy about 80% of the slave camera's viewing area 150. The object of interest 110 could initially occupy a greater or lesser portion of the slave camera's viewing area 150, such as 90% or more, or 50% or less, depending on desired functionality. Additionally or alternatively, as shown in calculations discussed below, the reference zooming factor can be determined by the larger of an object of interest's height or width, relative to the viewing area 130, 150 of the master camera 120 or the slave camera 140.

Figure 2:
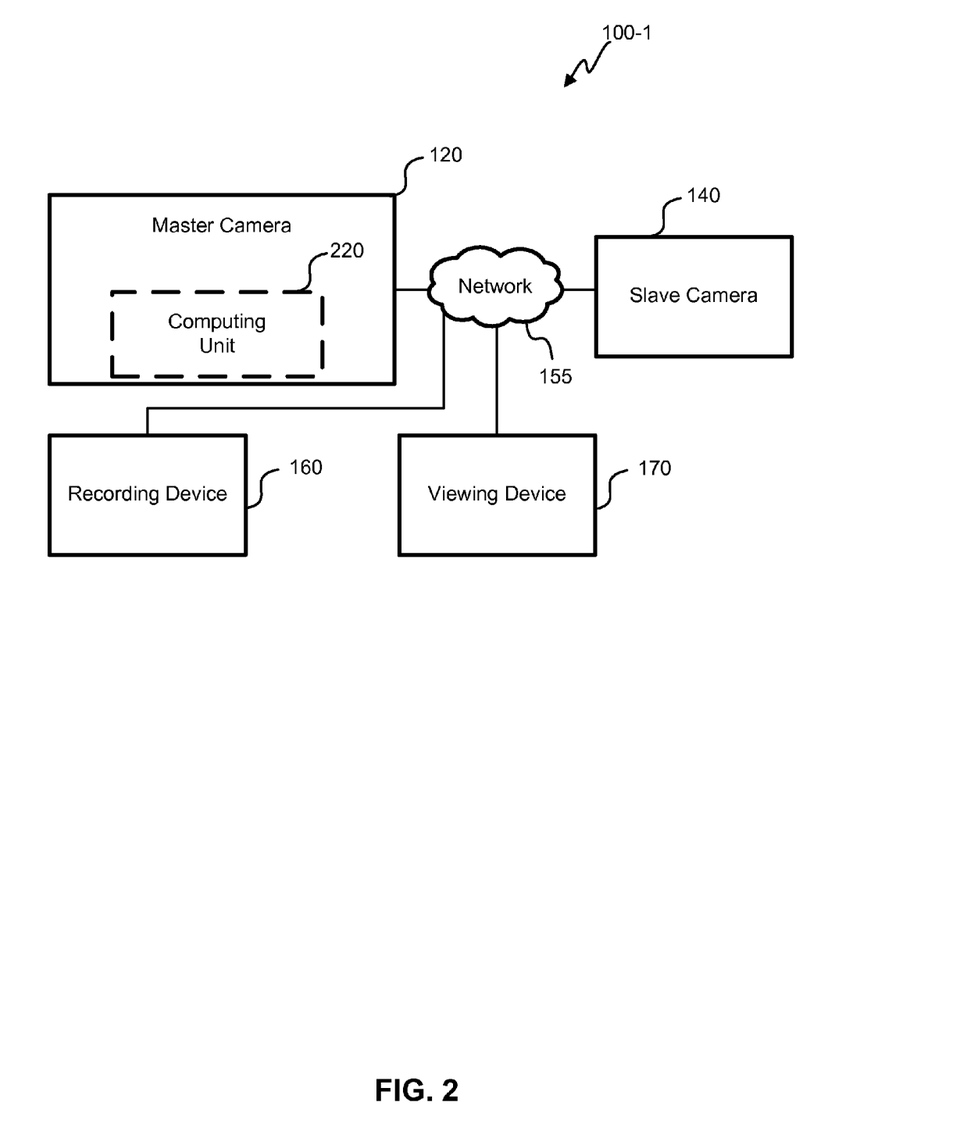
FIG. 2 is a block diagram of the video surveillance system of FIG. 1.

FIG. 2 is a block diagram illustrating a device-level layout of the video surveillance system 100-1. This block diagram is provided as an example only, and is not limiting. The video surveillance system 100-1 can be altered, by, for example, including multiple master cameras 120 and/or slave cameras 140, or having devices added, removed, rearranged, and/or combined.

A network 155 enables communication between the components. The network 155 here is an Ethernet network, although the network 155 can include any combination of wired and wireless networks using technologies such as WiFi, optical, coaxial, and/or satellite. Images from the master camera 120 and/or the slave camera 140 are communicated though the network 155 to a recording device 160, such as a videocassette recorder (VCR) or digital video recorder (DVR), that stores image information. Images from the master camera 120 and/or the slave camera 140 are also communicated to a viewing device 170, such as a television or computer monitor, allowing security officers and/or other individuals to monitor the areas shown in the images.

A computing unit 220 comprises part of the master camera 120 (e.g., located within a housing of the master camera 120). Alternatively, the computing unit 220 can be integrated into another component in the video surveillance system 100-1, such as the slave camera 140, or can be a stand-alone device, such as a computer (not shown). As described in more detail below, the computing unit 220 gathers information from the master camera 120 and the slave camera 140 to calculate a zooming value for the slave camera 140. The computing unit 220 communicates information through the network 155 causing the slave camera 140 to change its zooming factor in accordance with the calculated zooming value.

Figure 3:
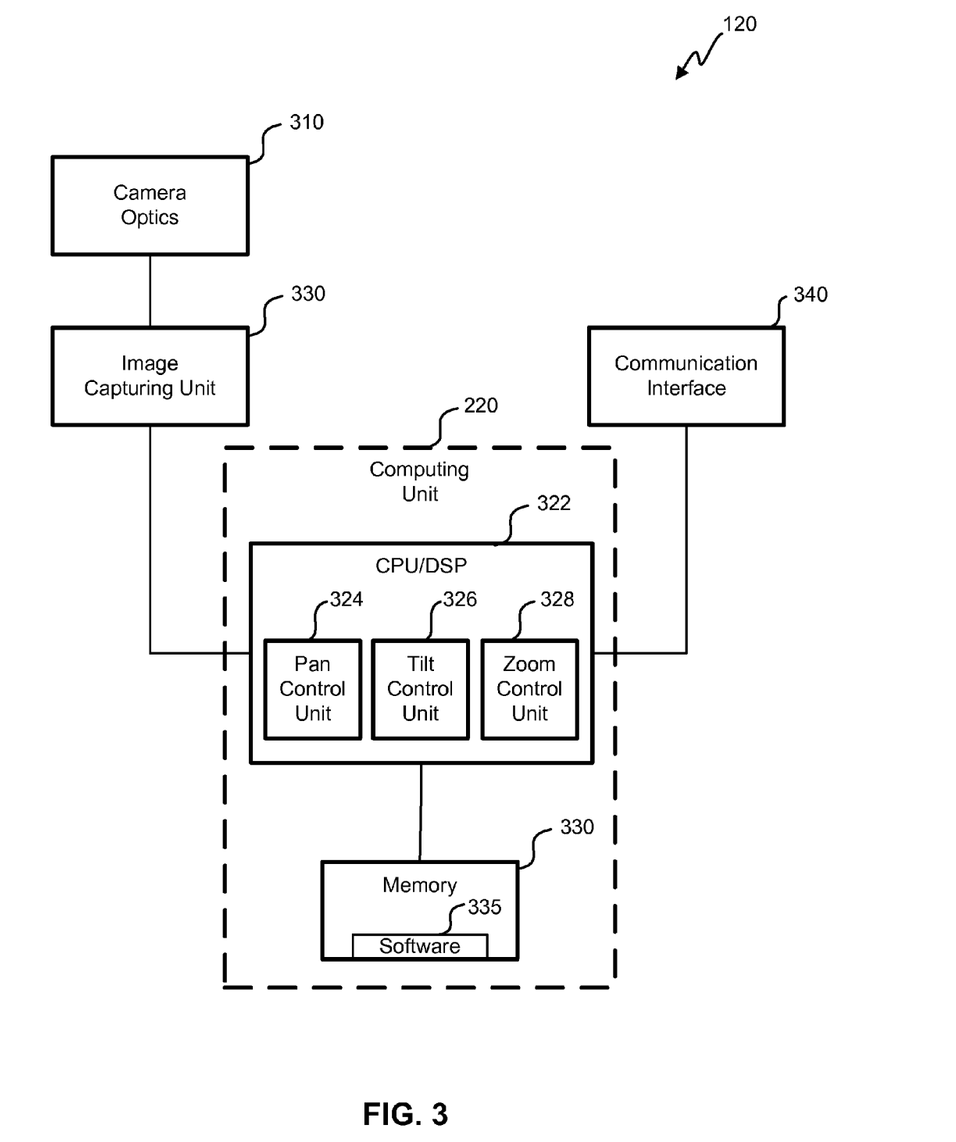
FIG. 3 is a block diagram of a camera including a computing unit with pan, tilt, and zoom control units.

FIG. 3 is a block diagram illustrating the components of the master camera 120, which can be altered to include more or less components according to desired functionality. The components include camera optics 310, typically comprising lenses and other optical components, communicatively coupled with an image capturing unit 330. The image capturing unit 330 utilizes charge-coupled device (CCD) and/or other technology to convert optical images into electrical information that is transferred to the computing unit 220. Also coupled with the computing unit 220 is a communication interface 340 through which information is sent to and from the network 155. The communicated interface 340 can, for example, receive image information from the slave camera 140, and send zooming information to the slave camera 140.

The computing unit 220 processes image information using various components. A central processing unit (CPU) or digital-signal processor (DSP) 322 is preferably an intelligent device, e.g., a personal computer central processing unit (CPU) such as those made by Intel® Corporation or AMD®, a microcontroller, an application specific integrated circuit (ASIC), etc. DSPs, such as the DM6446 made by Texas Instruments®, can also be used. The CPU/DSP 322 is coupled with a memory 330 that includes random access memory (RAM) and read-only memory (ROM). The memory 330 is non-transitory and preferably stores machine-readable, machine-executable software code 335 containing instructions that are configured to, when executed, cause the CPU/DSP 322 to perform various functions described herein. Alternatively, the software 335 may not be directly executable by the processor CPU/DSP 322 but is configured to cause the processor CPU/DSP 322, e.g., when compiled and executed, to perform functions described.

The computing unit 220 controls tracking of the object of interest 110, at least in part. The computing unit 220 uses the image information from the image capturing unit 330 to detect the object of interest 110 in the master camera's viewing area 130. The computing unit 220 also receives image information from the slave camera 140 from the communication interface 340, which is connected to the network 155. With information from both the master camera 120 and slave camera 140, the CPU/DSP 322 can control the pan, tilt, and zooming of the slave camera 140 using a pan control unit 324, a tilt control unit 326, and a zoom control unit 328, respectively. Alternatively, the computing unit 220 can control the zooming of the slave camera 140, as detailed below, with panning and tilt of the slave camera 140 controlled elsewhere.

Figure 4A:
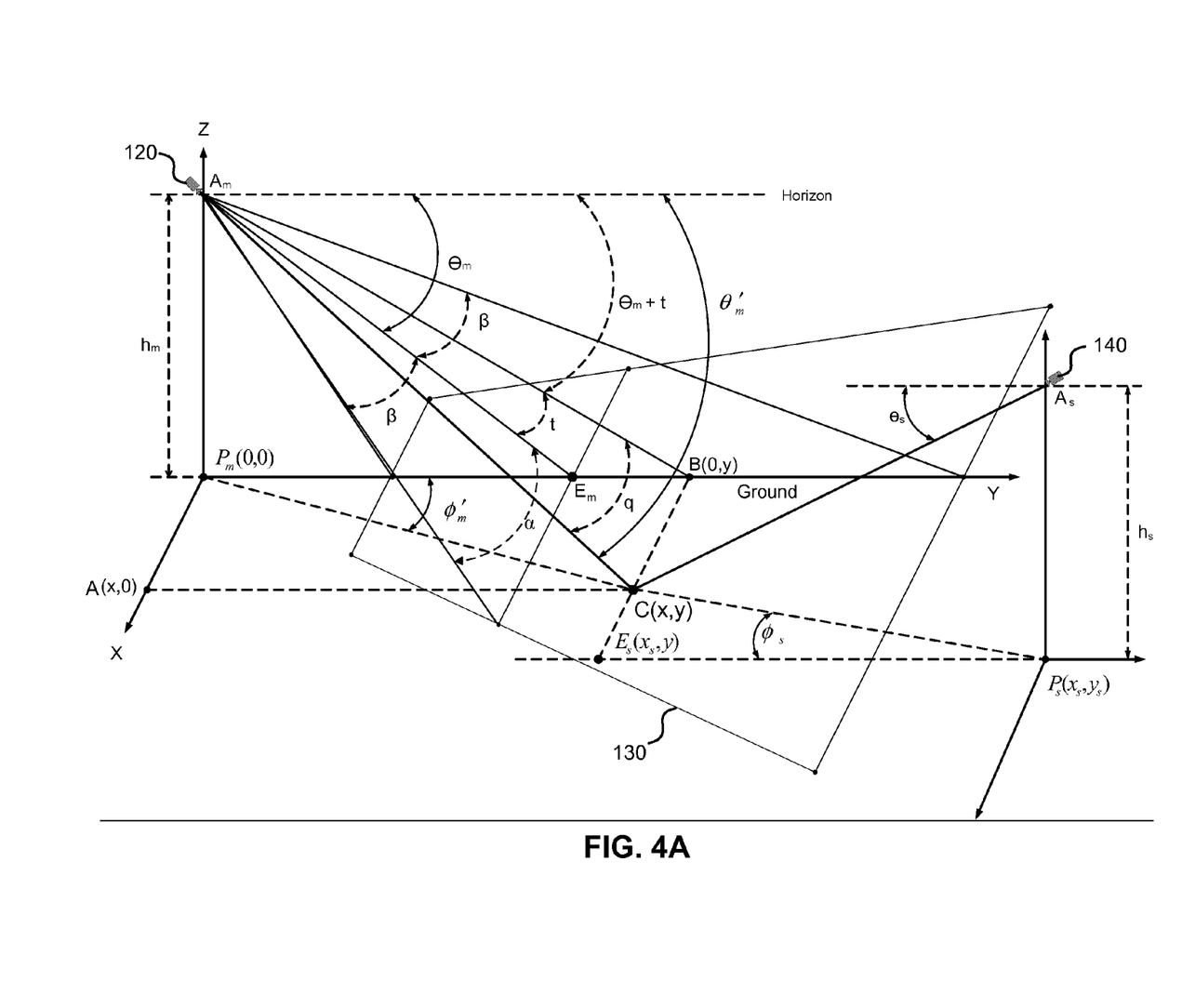
FIG. 4A is a simplified perspective view of the video surveillance system of FIG. 1 and its corresponding geometry.
Figure 4B:
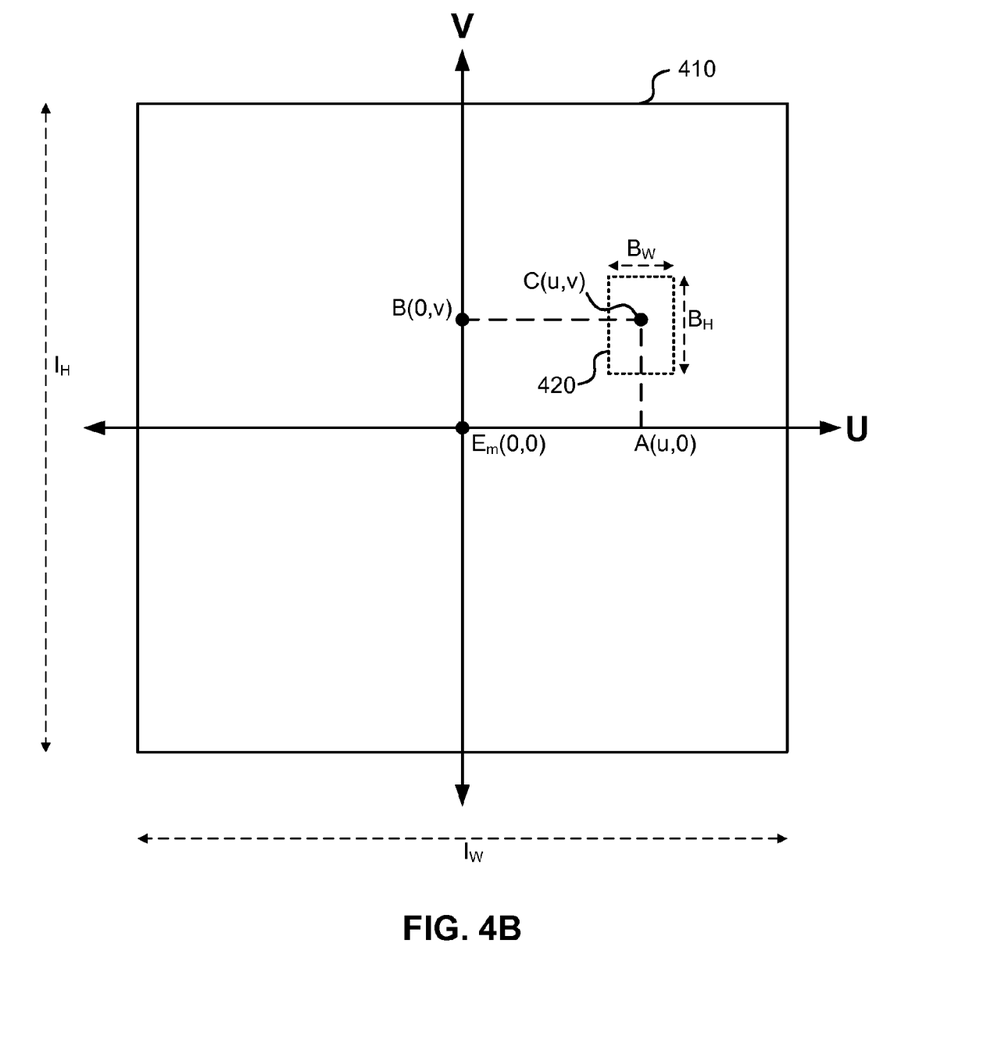
FIG. 4B is an illustration of an image seen by the master camera of FIG. 1, with corresponding geometry.

FIG. 4A is a simplified geometrical representation of a two-camera video surveillance system, which facilitates the discussion of how a zooming factor is derived. Using an orthogonal coordinate system centered on the ground below the master camera 120, the world coordinates of the master camera 120 and the slave camera 140 are $(0, 0, h_m)$ and $(x_s, y_s, h_s)$, respectively. FIG. 4B shows an image 410 seen by the master camera 120, corresponding to the master camera's viewing area 130. Variables shown in FIGS. 4A-4B and used in the calculations below are defined as follows:

$\theta_m$ is the tilt angle of the master camera 120;

$\phi_s$ is the tilt angle of the slave camera 140;

$\phi'_m$ is an angle of the master camera 120 between a point at the master camera's center point of view, $E_m$, (projected on the xy plane) and a center C of the object of interest;

$\phi_s$ is an angle of the slave camera 140 between a point at the slave camera's center point of view, $E_s$, (projected on the xy plane) and the center C of the object of interest;

α is half of the horizontal field of view of the master camera 120 (in degrees or radians);

β is half of the vertical field of view of the master camera 120 (in degrees or radians);

$I_w$ is the image width (in pixels) of the master camera 120; and $I_h$ is the image height (in pixels) of the master camera 120.

This geometrical setup facilitates defining a relationship to be established between world coordinates and image coordinates, which are coordinates of an image corresponding to the master camera's viewing area 130. Such image coordinates can be represented in pixels. For example, let the center C of the object of interest 110 (not shown) in the image coordinates be (u,v), with a corresponding world coordinate at (x, y, 0). The point, B(0, v), in the image coordinate then has a corresponding point, B(0,y, 0), in the world coordinate system. As shown in FIG. 4A, angle q is an angle of the master camera 120 between point B and point C, and angle t is an angle of the master camera between point B and master camera's center point of view $E_m$.

Referring to the image coordinates shown in FIG. 4B, a bounding box 420 is established for the object of interest 110. The bounding box 420 represents a rectangle circumscribing the object of interest 110 as shown in an image corresponding to the master camera's viewing area 130. The dimensions of the bounding box 420, $B_w$ by $B_h$, are therefore measured in pixels, where $B_w$ and $B_h$ are the corresponding width and height of the bounding box 420, respectively. The width and height of the bounding box 420 typically represent a maximum width and a maximum height of the object of interest in image coordinates.

The world coordinate of C projected onto the xy plane can be computed as follows:

$$x = \frac{h_m \cdot \tan(p)}{\sin(\theta_m + 1) \cdot \sqrt{\tan^2(t) + 1}}, \quad (1)$$

$$y = \frac{h_m}{\tan(\theta_m + t)}, \quad (2)$$

$$z = 0; \quad (3)$$

where intermediate variables p and t are calculated as:

$$p = \tan^{-1}\left(\frac{2 \cdot \tan\alpha}{I_w} \cdot u\right) \text{ and} \quad (4)$$

$$t = \tan^{-1}\left(\frac{2 \cdot \tan\beta}{I_h} \cdot v\right). \quad (5)$$

A pseudo reference zooming factor, $M_1$, corresponding to the master camera 120 when the object 110 is located at the center of the master camera's viewing area 130, can be computed as follows:

$$M_1 = \min\left(\frac{I_w}{B_w}, \frac{I_h}{B_h}\right). \quad (6)$$

Because the object of interest 110 may not be located at the center of the master camera's viewing area 130, the actual reference zooming factor, $M'_1$, corresponding to the master camera 120 is:

$$M'_1 = M_1 \cdot \frac{\sin(2 \cdot \theta_m)}{\sin(2 \cdot \theta'_m)}, \quad (7)$$

where $\theta'_m$ is the corresponding tilt angle for zooming factor $M'_1$.

The zooming factor of the master camera 120 does not change. The zooming factor of the master camera 120 is a reference zooming factor used to calculate a zooming factor, $M_2$, for the slave camera 140 as follows:

$$M_2 = M'_1 \cdot \frac{\|\overline{A_sC}\|/\cos(\theta_s)}{\|\overline{A_mC}\|/\cos(\theta'_m)} \quad (8)$$

$$M'_1 \cdot \frac{\cos(\theta'_m)}{\cos(\theta_s)} \cdot \frac{\sqrt{(x-x_s)^2 + (y-y_s)^2 + h_s^2}}{h_m/\sin\theta'_m},$$

or $$M_2 = \frac{M'_1 \cdot \cos(\theta'_m) \cdot \sin(\theta'_m) \cdot \sqrt{(x-x_s)^2 + (y-y_s)^2 + h_s^2}}{\cos(\theta_s) \cdot h_m} \quad (9)$$

The distance of the object of interest 110 to the slave camera 140 can be computed by:

$$\|\overline{A_sC}\| = \sqrt{(x-x_2)^2 + (y-y_s)^2 + h_s^2} = \frac{h_s}{\sin(\theta_s)}. \quad (10)$$

Therefore, because the tilt angle of the slave camera 140 is known, the formula for the zooming factor for the slave camera 140 can be modified into a simpler form as follows:

$$M_2 = M'_1 \cdot \frac{h_s \cdot \sin(2 \cdot \theta'_m)}{h_m \cdot \sin(2 \cdot \theta_s)} \quad (11)$$

$$= M_1 \cdot \frac{\sin(2 \cdot \theta_m)}{\sin(2 \cdot \theta'_m)} \cdot \frac{h_s \cdot \sin(2 \cdot \theta'_m)}{h_m \cdot \sin(2 \cdot \theta_s)}$$

$$= M_1 \cdot \frac{h_s \cdot \sin(2 \cdot \theta_m)}{h_m \cdot \sin(2 \cdot \theta_s)}.$$

Figure 5:
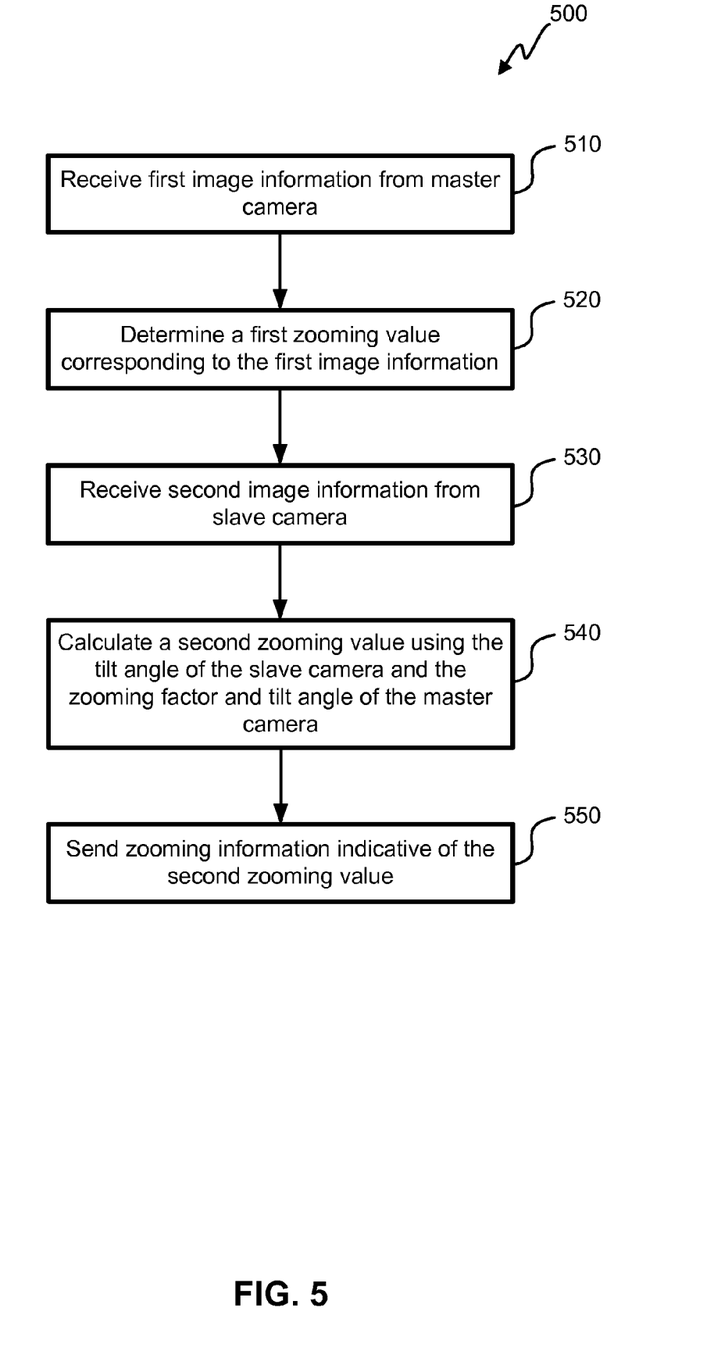
FIG. 5 is a block flow diagram of a method for determining a zoom factor for the slave camera in the video surveillance system of FIG. 1.

Referring to FIG. 5, with further reference to FIGS. 1-4, a process 500 of determining a zoom factor for a slave camera 140 in a video surveillance system utilizing the master camera 120 and the slave camera 140 is shown. The process 500 is, however, an example only and not limiting. The process 500 can be altered, e.g., by having stages added, removed, rearranged, combined, and/or performed concurrently.

At stage 510, first image information from the master camera 120 is received. The first image information provides sufficient information to convey a first zooming factor or similar zooming value relating to a first image. For example, the image information can include the first zooming factor, or variables such as the bounding box 420 height $B_H$ and width $B_w$, and coordinates or other indicators of a location of the object of interest 110. Alternatively, the information can include other information, such as raw image data, from which these or other variables can be determined. At stage 520, a first zooming value corresponding to the first image information is determined using the first image information and equation 6.

At stage 530, second image information is received from the slave camera 140. Here, the information received is indicative of a tilt angle of the slave camera 140, including the tilt angle itself or sensor readings or measurements from which the tilt angle is derived. The tilt angle corresponds to an image captured by the slave camera 140.

The second image information and the first image information correspond to images captured when the object of interest 110 is at substantially the same position. Referring to FIG. 4A, for example, this means the object of interest 110 is at position C(x, y, 0) while first and second images are captured by the master camera 130 and the slave camera 140, respectively. The first and second images may be captured at different times, and the tilt angle of the slave camera 140 preferably changes by no more than a few degrees, if at all, from the time the first image is captured to the time the second image is captured. This helps ensure the accuracy of the calculated zooming factor.

Referring again to FIG. 5, a second zooming value is calculated at stage 540. With tilt angles of both the master camera 120 and the slave camera 140, as well as a first zooming value, the second zooming value—corresponding to a zooming value of the slave camera 140—can be calculated using geometrical methods, such as from equation 11 above. At stage 550, zooming information indicative of the second zooming value is sent from zoom control unit 328 of the master camera. The zooming information can be sent to the slave camera 140 directly or to a device elsewhere in the surveillance system 100-1 configured to receive the zooming information and adjust the zooming value of the slave camera 140 in accordance with the second zooming value.

Figure 6:
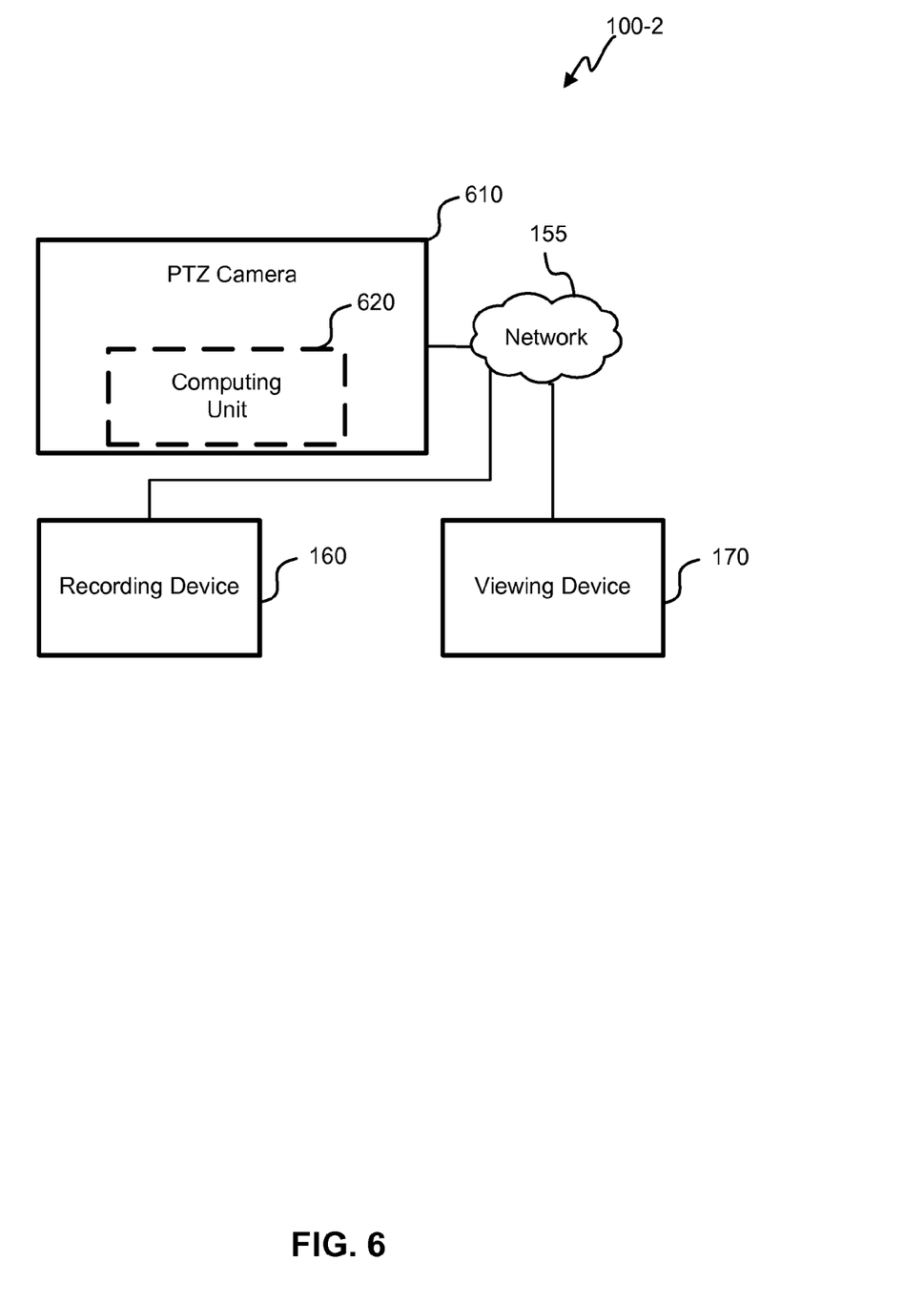
FIG. 6 is a block diagram of a video surveillance system utilizing a single pan, tilt, and zoom (PTZ) camera.

Other configurations may be used. For example a single camera can be used instead of a master camera and a slave camera. FIG. 6 is a block diagram illustrating a video surveillance system 100-2 utilizing a single PTZ camera 610 with components similar to those shown in FIG. 3. As with system 100-1 shown in FIG. 2, the system 100-2 is provided as an example only, and is not limiting. Devices may be added, omitted, combined, or separated. For instance, configurations may provide multiple cameras with computing units 620, and/or one or more stand-alone computing units 620. Additionally, as with the computing unit 220 of system 100-1 shown in FIG. 2, computing unit 620 will include the hardware and/or software functionality to perform the functions described herein.

With the system 110-1, rather than using a tilt angle and reference zooming factor from a master camera, an initial tilt angle and zooming factor of the PTZ camera 610 are used. When the object of interest 110 moves to a different distance from the PTZ camera 610 and the PTZ camera's tilt angle is adjusted accordingly, a new zooming factor for the PTZ camera 610 is calculated.

Because the variables involved in a single-camera system differ from those of a system with a master camera 120 and a slave camera 140, the mathematics for determining the desired zooming factor is also different. For instance, referring to the geometrical representation of a single-camera embodiment shown in FIG. 7, in order to keep the size of the object of interest 110 constant with respect to the viewing area of the PTZ camera 610, the zooming factor is proportional to the distance of the camera to the object of interest 110 as follows:

$$M_2 = M_1 \cdot \frac{D_2}{D_1}, \quad (12)$$

where $D_1$ and $D_2$ are first and second distances from the camera 610 to the object of interest 110, respectively, and where $M_1$ and $M_2$ are corresponding zooming factors for distances $D_1$ and $D_2$, respectively.

Figure 7:
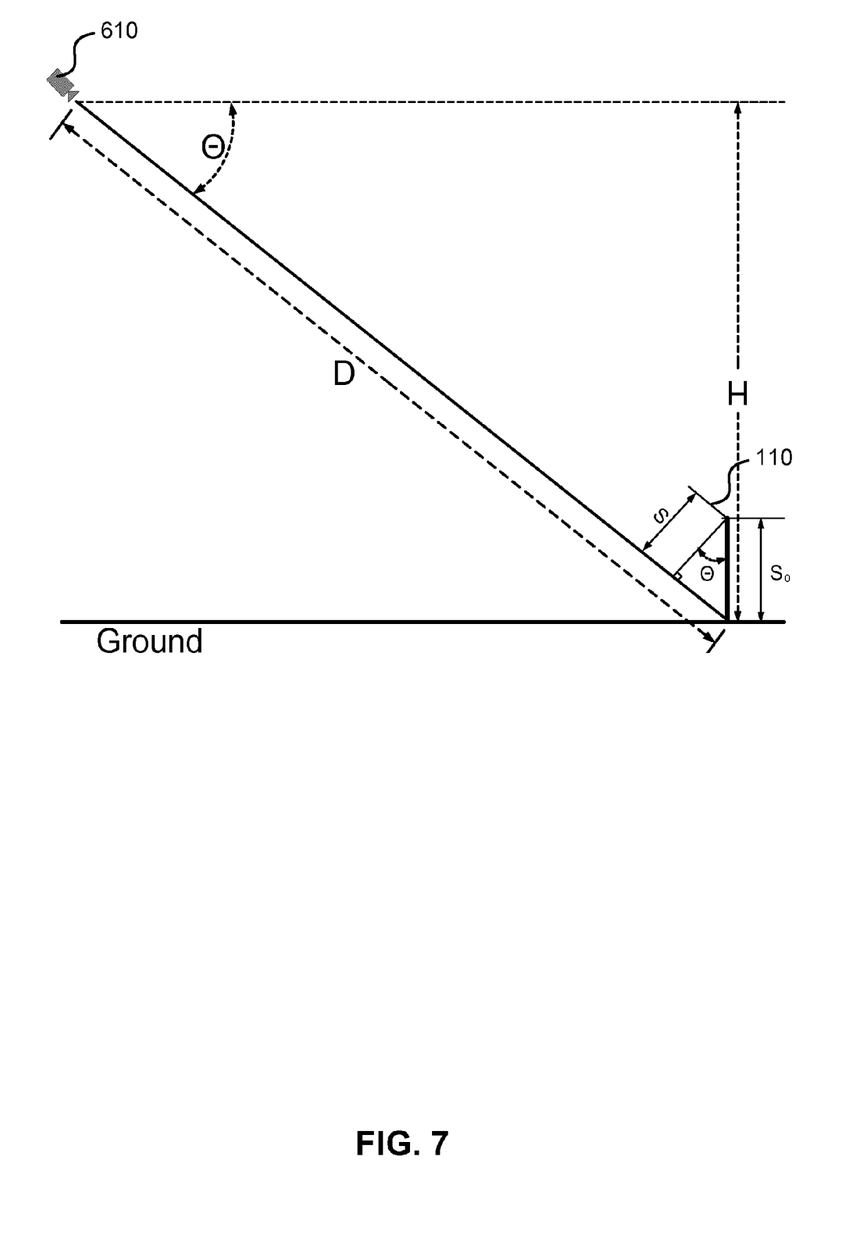
FIG. 7 is a simplified side view of the video surveillance system of FIG. 6 and its corresponding geometry.

The PTZ camera 610 has variables defined as follows:
H is the height of the camera;
θ is the tilt angle of the camera; and
D is the distance from camera to the ground where the object of interest 110 is located.

The relationship between H, D, and θ is therefore:

$$\sin(\theta) = \frac{H}{D}, \text{ or} \quad (13)$$

$$D = \frac{H}{\sin(\theta)}, \quad (14)$$

and the relationship between a first zooming factor, $M_1$, and a second zooming factor, $M_2$, becomes:

$$M_2 = M_1 \cdot \frac{\sin(\theta_1)}{\sin(\theta_2)}, \quad (15)$$

where $\theta_1$ and $\theta_2$ are first and second tilt angles of the PTZ camera 610 for distances $D_1$ and $D_2$, respectively. Thus, for known zooming factor $M_1$ and tilt angle $\theta_1$ at distance $D_1$, the zooming factor $M_2$ can be determined if the tilt angle $\theta_2$ is known.

The formulae derived above assume that the object of interest 110 is on the ground and its height compared with its width or length is negligible, or the object is very far away from the camera (e.g., θ is very small). To factor in height, the relationship between the height of the object of interest 110 and the height as seen by the PTZ camera 610 is determined according to:

$$S = S_0 \cdot \cos(\theta), \quad (16)$$

where $S_0$ is the height of the object of interest 110 and S is the height as seen by the PTZ camera 610. Because cos(θ) is less than 1, S can be computed the same as the if distance to the object of interest 110 is increased with a factor of 1/cos(θ).

With this relationship, the zooming factor equation above is modified to yield:

$$M_2 = M_1 \cdot \frac{D_2/\cos(\theta_2)}{D_1/\cos(\theta_1)} \quad (17)$$

$$= M_1 \cdot \frac{D_2 \cdot \cos(\theta_1)}{D_1 \cdot \cos(\theta_2)}$$

$$= M_1 \cdot \frac{\sin(\theta_1) \cdot \cos(\theta_1)}{\sin(\theta_2) \cdot \cos(\theta_2)}.$$

This equation can be simplified as follows:

$$M_2 = M_1 \cdot \frac{\sin(2 \cdot \theta_1)}{\sin(2 \cdot \theta_2)}. \quad (18)$$

When compared with equation 15, factoring in the height of the object of interest 110 results in multiplying $\theta_1$ and $\theta_2$ by a factor of 2. Thus, the factor of 2 can be removed from equation 18 (resulting in equation 15) if the height of the object of interest 110 is ignored. Similarly, with regard to equation 11, the factor of 2 multiplied with $\theta_S$ and $\theta_M$ can be removed if the height of the object of interest 110 in the two-camera system 100-1 of FIG. 2 is ignored.

Figure 8:
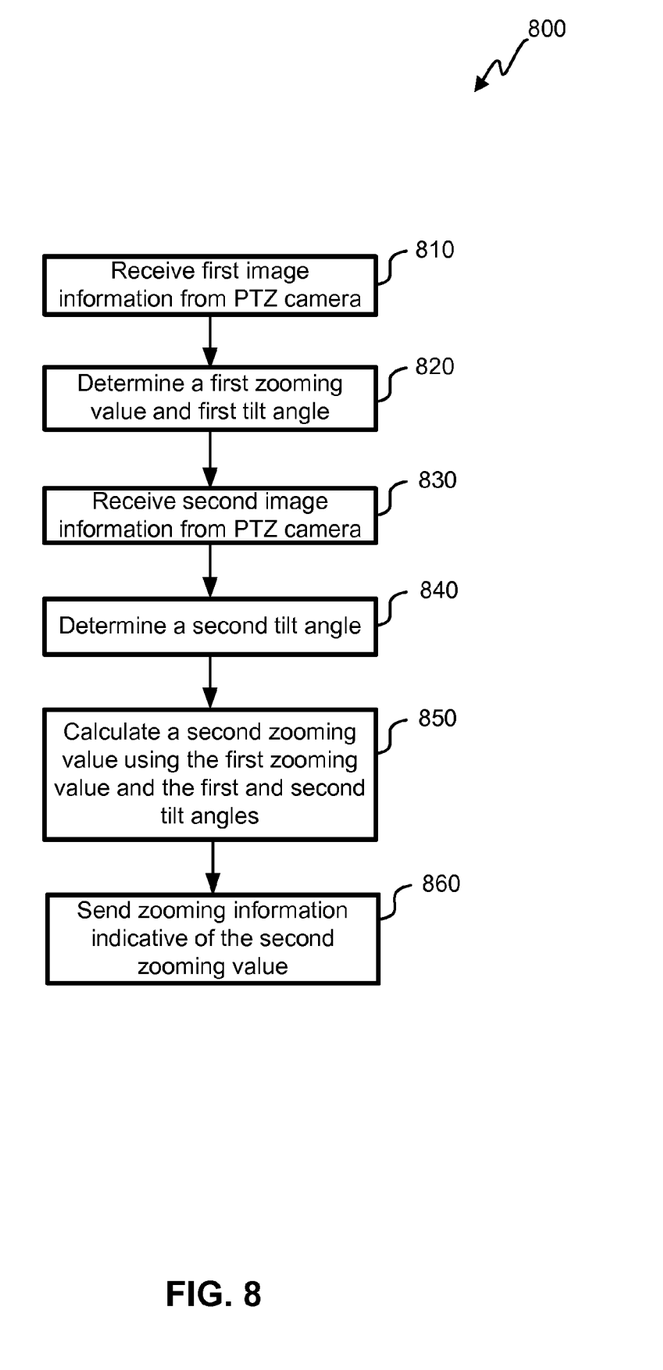
FIG. 8 is a block flow diagram of a method for determining a zoom factor for the PTZ camera in the video surveillance system of FIG. 6.

Referring to FIG. 8, with further reference to FIGS. 6-7, a process 800 of determining a zoom factor for the PTZ camera 610 is shown. The process 800 is, however, an example only and not limiting. The process 800 can be altered, e.g., by having stages added, removed, rearranged, combined, and/or performed concurrently.

At stage 810, first image information is received from the PTZ camera 610, and at stage 820 a first zooming value and a first tilt angle are determined. This includes, for example, receiving the first image information by the computing unit 620 in the PTZ camera 610, from another component within the PTZ camera 610 and/or from within the computing unit 620. As with the process 500, the first image information is indicative of a first zooming value and a first tilt angle. At stage 810, however, the first image information corresponds to an image of the PTZ camera 610. The first zooming value and the first tilt angle may be explicitly or implicitly included in the first image information.

The first image information is preferably provided after the PTZ camera 610 has been calibrated to the object of interest 110. In other words, the first image information is provided and determined once the PTZ camera 610 has properly tracked the object of interest 110 (e.g., panned/tilted to ensure the object of interest 110 is in the desired portion of the viewing area) and adjusted to a desirable zooming factor. For example, the PTZ camera 610 can be configured to pan, tilt, and zoom to help ensure the object of interest 110 at a first location is in the center of the viewing area and that it occupies about 80% (or another derived amount) of the viewing area. After the object of interest 110 moves to a second location, the PTZ camera 610 continues to track the object of interest 110, adjusting the tilt angle, as appropriate.

At stage 830, second image information is received from the PTZ camera 610, and at stage 840, a second tilt angle is determined. Stages 830 and 840 are similar to stages 810 and 820, and the second image information therefore can include the same type of information as the first image information. This includes explicitly or implicitly conveying the second tilt angle. At stage 850 equation 18 is used to calculate a second zooming factor using the first zooming value, first tilt angle, and second tilt angle.

At stage 860, zooming information indicative of the second zooming value is sent. For example, the zooming information can be sent from a computing unit 220 to another component of the PTZ camera 610 that is configured to receive the zooming information and adjust the zooming value of the PTZ camera 610 in accordance with the second zooming value.

The methods, systems, and devices discussed above are examples and not limiting. Various configurations may omit, substitute, or add various procedures or components as appropriate. For instance, features described with respect to certain configurations may be combined in various other configurations. For example, a master camera 120 of FIG. 2 can be included in system 100-2 of FIG. 6, allowing the system 100-2 of FIG. 6 to operate in two modes: a first mode in which the PTZ camera 610 operates as a slave camera in a master-slave configuration, and a second mode in which the PTZ camera 610 provides the functionality described in a single-camera configuration. Different aspects and elements described above as being separate or in different configurations may be combined. Moreover, although configurations described herein are in the context of video surveillance systems, the methods, systems, and devices discussed above applications apply in other contexts where a camera system tracks (or can track) an object of interest, such as sporting events, video conferences, and motion capture systems, among others.

Specific details are given in the description to provide a thorough understanding of example configurations and implementations. Other examples may or may not use these specific details. For example, well-known circuits, processes, algorithms, structures, and techniques have been shown without unnecessary detail in order to avoid obscuring the description.

Operations described above in a sequential process may be performed in a different sequence, and operations can be omitted or added to the processes described, and/or may be performed concurrently. Furthermore, processes described above may be implemented by hardware, software executed by a processor, firmware, middleware, microcode, hardware description languages, or any combination thereof. When implemented in software, firmware, middleware, or microcode, the program code or code segments to perform the operations may be stored in a non-transitory computer-readable medium such as a storage medium. One or more processors can execute the software to perform the appropriate tasks.

Various modifications, alternative constructions, and equivalents may be used without departing from the spirit of the disclosure. For example, elements described above may be components of a larger system, where other rules may take precedence over or otherwise modify the description. Also, a number of steps may be undertaken before, during, or after the above elements are considered. Accordingly, the above description is not limiting of the disclosure and does not define the bounds of the claims.

Other examples and implementations are within the scope and spirit of the disclosure and appended claims. Features implementing functions may be physically located at various positions, including being distributed such that portions of functions are implemented at different physical locations.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Further, more than one invention may be disclosed.

What is claimed is:

1. A method for determining a zooming value of an image source, the method comprising:
   receiving, at a computing unit of a first camera of the image source, first image information of a first image of an object of interest, wherein the first image information comprises a first tilt angle of the first camera of the image source;
   receiving second image information, at the computing unit of the first camera of the image source, of a second image of the object of interest, wherein the second image information is indicative of a second tilt angle of a second camera of the image source, the first camera being separate from the second camera;
   determining, at the computing unit of the first camera of the image source, a first zooming value corresponding to the first image;
   calculating, at the computing unit of the first camera of the image source, a second zooming value from the first tilt angle, the first zooming value, and the second tilt angle, such that a second size of the object provided by the second camera with the second tilt angle remains constant with respect to a first size of the object in the first image responsive to the second zooming value being applied by the second camera; and
   sending zooming information indicative of the second zooming value from the computing unit of the first camera to the second camera.

2. The method recited in claim 1, further comprising:
   capturing the first image with the first camera of the image source using the first tilt angle while the object of interest is at a particular position; and
   capturing the second image with the second camera, separate from the first camera, of the image source using the second tilt angle while the object of interest is at the particular position.

3. The method recited in claim 2, wherein calculating the second zooming value further comprises calculating the second zooming value from at least one of:

a height of the first camera relative to the ground, or
a height of the second camera relative to the ground.

4. The method recited in claim 2, further comprising controlling tracking of the object of interest by the second camera.

5. The method recited in claim 2, wherein determining the first zooming value comprises comparing a size of the object of interest to a viewing area of the first camera.

6. The method recited in claim 5, wherein determining the first zooming value comprises determining a smaller of:
   a ratio of a height of the viewing area of the first camera to a height of the portion of the viewing area of the first camera occupied by the object of interest, and
   a ratio of a width of the viewing area of the first camera to a width of the portion of the viewing area of the first camera occupied by the object of interest.

7. The method recited in claim 1, further comprising determining at least one of the first tilt angle or the second tilt angle.

8. The method of claim 1, wherein determining the first zooming value further comprises:
   detecting the object of interest in the first image information; and
   determining, in image coordinates, a bounding box around the object of interest based on a detected dimensions of the object of interest.

9. The method of claim 1, wherein the method further comprises:
   tracking the object of interest based on additional image information received from the first camera; and
   sending updated zooming information indicative of an updated second zooming value from the computing unit of the first camera to the second camera.

10. The method of claim 1, wherein determining the first zooming value comprises determining whether the object of interest is located at a center of a viewing area of the first camera and determining the first zooming value based in part on whether the object of interest is located at the center of the viewing area.

11. The method of claim 1, wherein calculating the second zooming value comprises setting the second zooming value proportional to the first zooming value.

12. The method of claim 1, wherein calculating the second zooming value comprises setting the second zooming value proportional to the sine of twice the first tilt angle divided by the sine of twice the second tilt angle.

13. A non-transitory machine-readable storage medium comprising instructions embodied thereon that, when executed by a computing device, cause the computing device to:
   determine, from first image information provided by a first camera of an image source, a first zooming value corresponding to a first image of an object of interest wherein the first image information comprises a first tilt angle of the image source;
   determine, from second image information provided by a second camera, separate from the first camera, of the image source, a second tilt angle corresponding to a second image of the object of interest;
   calculate a second zooming value from the first tilt angle, the first zooming value, and the second tilt angle, such that a second size of the object provided by the second camera with the second tilt angle will remain constant with respect to a first size of the object in the first image responsive to the second zooming value being applied by the second camera; and
   send zooming information indicative of the second zooming value toward the second camera, wherein the computing device comprises a computing unit of the first camera of the image source.

14. The non-transitory machine-readable storage medium recited in claim 13, wherein the instructions that cause the computing device to calculate the second zooming value are further configured to cause the computing device to calculate the second zooming value from at least one of:
   a height of the first camera relative to the ground, or
   a height of the second camera relative to the ground.

15. The non-transitory machine-readable storage medium recited in claim 14, wherein the instructions embodied thereon, when executed by the computing device, further cause the computing device to control tracking of the object of interest by the second camera.

16. The non-transitory machine-readable storage medium recited in claim 14, wherein the instructions that cause the computing device to determine the first zooming value are configured to cause the computing device to compare a size of the object of interest relative to a viewing area of the first camera.

17. The non-transitory machine-readable storage medium recited in claim 13, wherein the instructions that cause the computing device to determine the first zooming value are configured to cause the computing device to compare a size of the object of interest relative to a viewing area of the first camera.

18. The non-transitory machine-readable storage medium recited in claim 13, wherein the instructions embodied thereon, when executed by the computing device, further cause the at least one machine to determine at least one of the first tilt angle or the second tilt angle.

19. The non-transitory machine-readable storage medium recited in claim 13, wherein the instructions that cause the computing device to calculate the second zooming value are further configured to set the second zooming value proportional to the first zooming value.

20. The non-transitory machine-readable storage medium recited in claim 13, wherein the instructions that cause the computing device to calculate the second zooming value are further configured to set the second zooming value proportional to the sine of twice the first tilt angle divided by the sine of twice the second tilt angle.

21. A system comprising:
   a first camera having a processor and a first tilt angle and a viewing area, the first tilt angle being fixed, wherein the first camera is configured to:
      capture, with the first camera, a first image of an object of interest while the object of interest is at a particular position; and
      output data regarding the first image;
   a second camera having an adjustable tilt angle enabling the second camera to track the object of interest, the second camera being separate from the first camera, wherein the second camera is configured to:
      capture, with the second camera using a second tilt angle, a second image of the object of interest while the object of interest is at the particular position; and
      output data regarding the second tilt angle; and
   the processor of the first camera being configured to:
      receive the data regarding the first image;
      determine a first zooming value for the first camera based on the data regarding the first image;
      receive the data regarding the second tilt angle;
      calculate a second zooming value from the first tilt angle, the first zooming value, and the second tilt angle, such that a second size of the object provided by the image source with the second tilt angle remains constant with respect to a first size of the object in the first image responsive to the second zooming value being applied by the image source; and send information indicative of the second zooming value from the processor of the first camera to the second camera to cause a zooming value of the second camera to change according to the second zooming value.

22. The system recited in claim 21, wherein the processor is configured to calculate the second zooming value by setting the second zooming value proportional to the first zooming value.

23. The system recited in claim 21, wherein the processor is configured to determine the first zooming value by comparing a portion of the viewing area of the first camera occupied by the object of interest to the viewing area of the first camera.

24. The system recited in claim 23, wherein the processor is configured to determine the first zooming value by determining a smaller of:
   a ratio of a height of the viewing area of the first camera to a height of the portion of the viewing area of the first camera occupied by the object of interest, and
   a ratio of a width of the viewing area of the first camera to a width of the portion of the viewing area of the first camera occupied by the object of interest.

25. The system recited in claim 21, wherein the processor is located within a first housing of the first camera.

26. The system recited in claim 21, wherein the processor is further configured to control the tracking of the object of interest by the second camera.

27. The system recited in claim 21, wherein the processor is further configured to calculate the second zooming value from at least one of:
   a height of the first camera relative to the ground, or
   a height of the second camera relative to the ground.

* * * * *